Nov. 26, 1946.  F. W. DWYER  2,411,508
PRESSURE GAUGE
Filed July 3, 1943
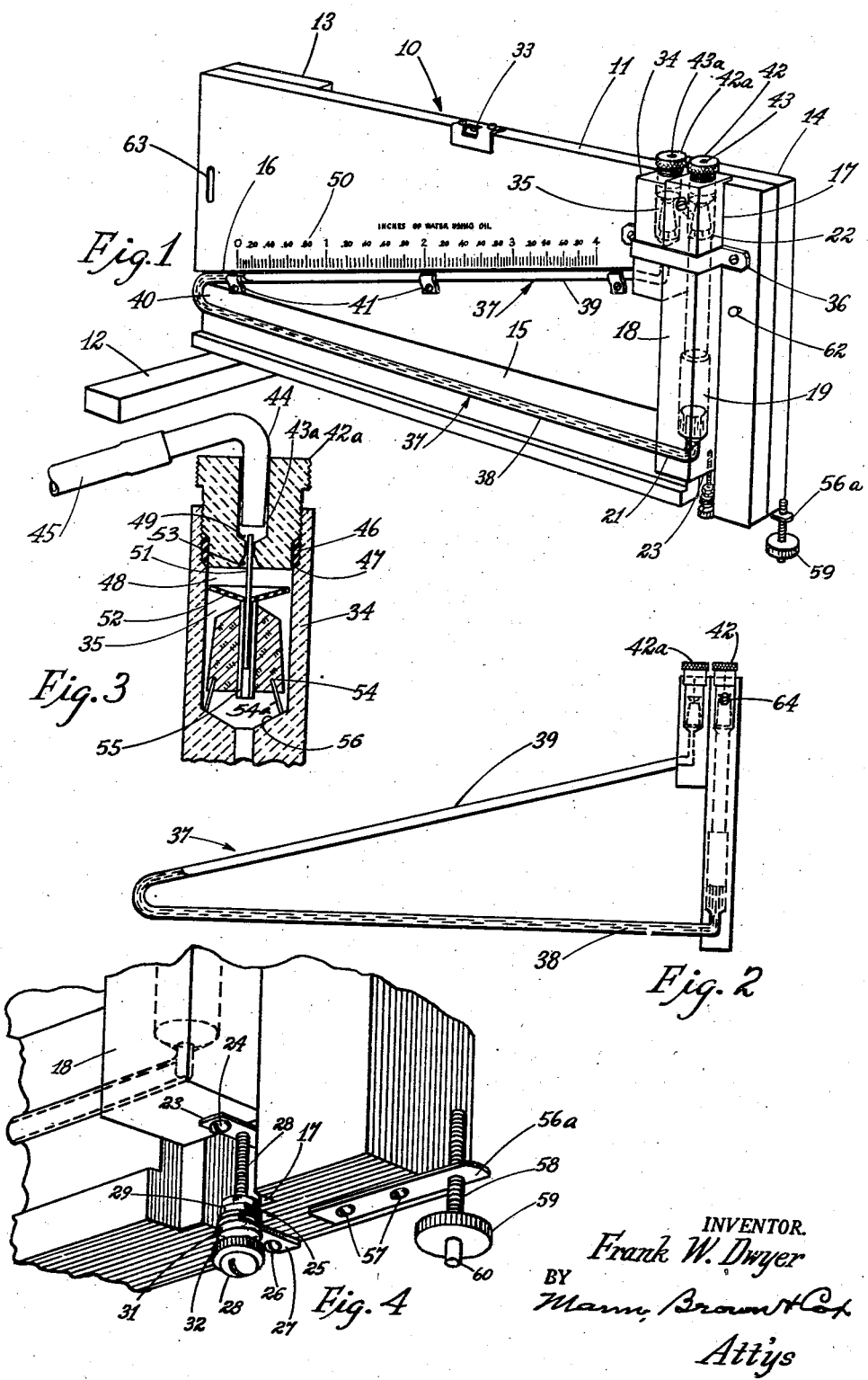
INVENTOR.
Frank W. Dwyer
BY
Mann, Brown & Co.
Atty's Patented Nov. 26, 1946

2,411,508

UNITED STATES PATENT OFFICE 2,411,508

PRESSURE GAUGE

Frank W. Dwyer, Chicago, Ill.

Application July 3, 1943, Serial No. 493,379

12 Claims. (Cl. 73—401)

This invention relates to pressure gauges and the like.

One of the objects of the invention is the provision of a new and improved gauge for determining pressures either above or below atmospheric, together with a novel container for the indicating fluid.

Another object of the invention is the provision of a new and improved gauge having novel means for leveling and adjusting the gauge for bringing the meniscus of the liquid column to the zero point.

A further object of the invention is the provision of a new and improved gauge having novel liquid traps for preventing the escape of the liquid in the indicating column when the pressure or suction exceeds a predetermined amount.

A still further object of the invention is the provision of a new and improved gauge that is simple in construction, efficient and accurate in use, that is easily assembled and adjusted, and that is provided with simple and efficient means for preventing the escape of the indicating liquid in event the pressure or suction exceeds the capacity of the gauge.

Other and further objects and advantages of the invention will appear from the following description, taken in connection with the accompanying drawing, in which Fig. 1 is a perspective view of the device;

Fig. 2 is a side elevation of the indicator fluid container, detached from the supporting board;

Fig. 3 is an enlarged vertical sectional view of one of the reservoirs, showing the trap valve in position therein; and Fig. 4 is a perspective view of the lower portion only of the device, on an enlarged scale and with parts broken away.

Referring now to the drawing, the reference character 10 designates the pressure gauge, which comprises a supporting wall 11 adapted to be vertically arranged and held in upright position by means of a bar 12, which extends transversely of what for convenience of description will be termed the outer end of the supporting board or wall 11, and rigidly attached thereto. The wall or board 11 may be reinforced at each end by bars 13, 14, which extend vertically across the ends thereof and are rigidly secured to the board. The lower portion of the board 11 is routed out or recessed to form a wide channel 15 extending lengthwise to the board adjacent its lower end, to provide a clearance for a portion of the indicating tube, as will presently appear. Extending diagonally upward from the outer end of the board and at an acute angle from the channel 15, and in communication with said channel, is a groove 16 for receiving the other arm of the indicating tube, as will hereinafter appear.

The front end of the board or support 11 is provided with a recess 17 extending vertically, that is, transversely to the board; and mounted in this recess is a reservoir block 18, of suitable material, for containing the indicating liquid. Preferably, though not necessarily, this reservoir is of plastic material and transparent. For the purpose of this application it may be considered as being made from a block of "Lucite" (thermoplastic methyl methacrylate resin). As shown, the block 18 is provided with a bore 19 extending longitudinally of the block and enlarged at its lower end. This enlarged portion of the bore is adapted to contain a liquid 21, which may be, and preferably is, a suitable light oil colored red or some other suitable color, as may be desired. The bore 19 extends to the upper end of the block 18, and its intermediate portion is restricted in diameter to form a shoulder 22 adjacent to the upper end of the board.

The block 18 is slidably mounted in the groove 17, and is adapted to be raised and lowered by the mechanism shown in Fig. 4 that will now be described. Mounted on the lower end of the block 18 is a plate 23 which is rigidly secured to the block, as by means of the screw 24. The plate 23 extends laterally into a counter-recess 25 formed in the bottom of the recess 17, as shown more clearly in Fig. 4. Attached to the bottom end of the board 11, as by means of a screw 26, is a plate 27, having an opening in its forward end through which a screw 28 extends. The screw 28 has mounted thereon the nuts 29 above the plate 27, and the latter is held between the nuts 29 and a shoulder 31 on the lower end of the screw 28, which holds the screw from vertical movement. The screw is adapted to engage a screw-threaded opening in the plate 23, so that when the knurled head 32 of the screw is rotated it will cause the plate 23 and the block 18 to be raised and lowered for positioning the meniscus of the liquid column, as will presently appear.

The recess 17 is enlarged in width at its upper end, and is adapted to receive, in addition to the block 18, a short block 34 having a bore therein for forming a chamber 35, as shown in dotted lines in Fig. 1. The block 34, which may be termed the "terminal block," rests on the ledge formed by the enlargement of the upper end of the recess 17. The terminal block 34 and block 18 are held in position by a loop strap 36, extending over the same, as shown in Fig. 1. This loop fits snugly enough to hold the terminal block 34 from movement and at the same time permit vertical movement of the block 18. The terminal chamber 35 and the main reservoir 19 are connected together and are in communication with each other through an indicator tube member 37, which is located in the channel 15 and groove 16. The tubular member 37 comprises a substantially horizontal portion 38 and an inclined portion 39, which together form a V or an acute angle 40, with one side substantially horizontal. The inclined portion 39 is rigidly held in the groove 16, as by means of suitable clips 41.

The section 39 of the angular tube member 37 is fixed within the groove, while the section 38 may be flexed. The tubular indicating member 37 may also be of "Lucite," or any other suitable transparent plastic. One end of this member is in communication with the lower end of the reservoir 19, and the upper end is in communication with the lower end of the chamber 35 through suitable passages in the blocks 18 and 34, respectively. A graduated pressure scale 50 is provided back of the inclined arm 37 for indicating pressure. The graduations are made with the board in upright position, with the top edge substantially horizontal, and in order that the readings shall be accurate it is necessary to level the board before taking readings. A spirit level 33 is mounted on the board 11 for leveling the same preparatory to making tests.

Suitable means are provided for preventing loss of the indicating fluid when the pressure exceeds the capacity of the gauge. The two blocks 34 and 18 are each provided at their upper ends with a trap valve, and since the two valves are duplicates of each other only one need be described.

As shown in Fig. 3, the block 34 is internally threaded at its upper end for receiving a closure or stopper 42ª, formed of a suitable material, such as plastic or the like. This closure is provided with an enlarged axial recess 43ª for detachably receiving the end of a tubular connector member 44, the opposite end of which has attached to it a rubber tube 45. The opposite end of the rubber tube has a tubular member attached thereto that is not seriously affected by heat or chemicals in the air, and that is adapted to be inserted in a chimney, or the like, for taking the readings of either pressure or suction. Since this arrangement is so well known to the art it is not felt necessary to illustrate or describe the same more in detail.

A gasket 46 may be provided between the closure or stopper 42ª and a shoulder 47 on the interior of the bore 48 of the block 34. The opening 43ª extends axially of the closure or stopper 42ª, and is provided adjacent its lower end with a restricted portion 49 for receiving the valve or stem 51 of a valve 52, which is adapted to close the opening 49 and prevent the escape of the liquid when the same fills the chamber 35. The valve 52 is concave upwardly and is of suitable resilient, comparatively thin, flexible material, such as neoprene (chloroprene rubber), or any other suitable material not affected by the liquid. By making the valve concave and of comparatively thin and resilient material, it is readily distorted to make a seal even though the stem be not exactly perpendicular. This is considered an important feature of the invention.

In order to guide the valve stem into the opening 49, in assembling the parts, the lower end of this opening may be flared downwardly and outwardly, as shown at 53. A float 54, of suitable material, is provided for raising the valve to its closed position by the liquid entering the chamber 35. As shown, the float 54 is of cork or like material, and extending through the vertical axis thereof is a tubular member 55, into which the lower end of the valve stem 51 is adapted to extend for guiding the valve.

In order that the liquid that may expand into the chamber 35 shall escape back into the tube 39, the lower end of the float 54 has inserted therein a plurality of pins 54ª which extend downwardly and outwardly around the lower end of the float, and are adapted to engage the shoulder 56 formed in the upper end of the block 34, shown more clearly in Fig. 3. When the retreat of the liquid downward from the chamber 35 causes lowering of the float 54 to relieve the thin rubber disc or valve 52 of sealing pressure, the valve tends to drop out of its sealing position by gravity and this tendency is desirably augmented by the weight of the pin forming the valve stem 51, the weight of the pin being exerted against the rubber valve.

Suitable means are provided for leveling the gauge preparatory to taking readings from the same. In the construction shown, the bottom end part of the inner end of the board 11 is provided with a laterally extending plate 56ª, which is rigidly attached to the board, as by means of the screws 57. The plate 56ª is provided with a screw-threaded opening adapted to be engaged by a screw 58, having a thumb-piece 59 thereon, and a supporting leg 60 extending downwardly therefrom whereby the screw may be turned for raising or lowering the front end of the board 11. The level 33 will indicate the correct position of the board when the same has been adjusted by the thumb-piece 59.

The board 11 may be provided with means whereby the same may be permanently attached to the wall of a factory building, or the like. In order to attach the gauge to a factory wall, or the like, the board 11 is provided with an opening 62 at one end for the reception of a screw, and at its other end with a slot 63 whereby the board may be adjusted to level position, as indicated by the bubble in the level 33. It is necessary, of course, to remove the support 12 before attaching the board 11 to the wall of the factory, or the like. It may be necessary at times to replenish the liquid in the reservoir 19, and in order that this may be done without removing the plugs 42 and 42ª the block 18 may be provided adjacent its upper end with a threaded opening extending into the bore, and which may be closed by a screw 64.

The blocks 18 and 34, together with the angular tube connection 37, constitute what may be termed the indicator unit. Any suitable means may be employed for supporting this unit. While the arm 38 is shown as being substantially horizontal, this is not necessary since this arm merely constitutes an addition to the capacity of the reservoir 19. It is only necessary that the parts be so mounted that when in reading position the level of the liquid in the reservoir 19 shall be in the plane of the meniscus of the tubular member 39.

When it is desired to determine the draft of a chimney, for instance, the connector 44 is inserted in the bore 43ª of the stopper 42ª of the block 34, the board 11 is adjusted to its level position by means of the thumb nut 59, and the meniscus of the liquid column in the indicator arm 39 is adjusted to zero by turning the thumbpiece 32 to either raise or lower the block 18, as the case may be, to the adjusted position. The free end of the tube 45, which is provided with a rigid extension used in such constructions, is then placed in the draft of the chimney, and the draft will exhaust air from above the liquid in the arm 39. The pressure of air on the liquid 21 in the reservoir 19 will force the liquid up the inclined passage 39 until an equilibrium is reached, after which the reading is made on the scale 50 along the side of the arm 39.

In measuring pressure the connector 44 is inserted in the opening 43 in the stopper 42. While in use with the connector in the opening 43ª, the opening 43 must not be closed. When not in use the passages 43 and 43ª are closed by suitable stoppers for preventing the escape of the indicator liquid 19, should the board be tilted or laid down flat.

It is thought from the foregoing, taken in connection with the accompanying drawing, that the construction and operation of my device will be apparent to those skilled in the art, and that changes in size, shape, proportion and detail may be made without departing from the spirit and scope of the appended claims.

I claim as my invention:

1. In a pressure gauge, an upstanding supporting member, a reservoir vertically adjustable thereon, a conduit in communication with said reservoir and in the form of an angle with one side extending diagonally upwardly and laterally, and rigidly secured to said member, said conduit being of flexible material and transparent, said reservoir and conduit being adapted to contain a liquid, a scale associated with said conduit graduated to indicate the pressure on said reservoir, and means for vertically adjusting said reservoir by flexing said conduit for adjusting the meniscus of the liquid in said conduit to zero on said scale.

2. In a draft gauge, a block of plastic material having a bore leading to a chamber therein, said chamber having an abutment in the lower portion thereof and an upwardly extending opening, a stopper for said opening having a passage therethrough, a valve for closing said passage from the inside, said valve comprising a valve stem insertable in said passage for guiding said stem, a concave resilient flexible valve for seating over said passage fixed on said stem, a float having a passage therethrough for receiving the lower end of said stem, and pins extending down from said float for engaging said abutment for preventing said stopper from closing said bore when said chamber is in upright position.

3. A pressure gauge comprising an upright base board having a channel across its lower edge portion and having a groove extending upwardly and forwardly from the outer end of said channel, a vertical recess across the inner edge of said board and extended laterally at its upper end, a block vertically adjustable in said recess and having a reservoir therein in communication with the atmosphere at its upper end, a second block having a chamber therein in the lateral extension of said recess, said chamber being in communication with the atmosphere at its uppermost part thereof, a conduit capable of being flexed having a transparent portion in the form of an acute angle having one arm extending along said channel and movable therein and the other along said groove, said conduit being in communication with said reservoir and chamber and being adapted to contain an indicating liquid, a valve in said chamber for preventing the escape of liquid therefrom, a scale along said inclined arm, a connector means for conducting pressure to said reservoir, a port above said reservoir in said firstnamed block through which an indicating liquid may be introduced to said reservoir, and a closure for said port.

4. In a pressure gauge, a block having a chamber therein, a stopper for closing the upper end of said chamber, an axial opening extending through said stopper and adapted to receive a connector member, a valve comprising a thin concave flexible member of elastic material, a float for elevating said member over said opening for closing the same when the indicating fluid rises above a predetermined height within said chamber, and a guide stem for said float.

5. In a pressure gauge, a reservoir, a support for the same, an indicating tube having a flexible portion in the form of an acute angle having one arm firmly connected to said reservoir and extending outwardly therefrom and the other arm connected to the outer end of the firstnamed arm and extending upwardly and laterally therefrom, means for rigidly securing the inclined arm to said support, means for raising and lowering said reservoir and flexing said tube, and a scale extending along said inclined arm.

6. In a draft gauge, a reservoir for containing an indicating liquid, a support therefor, a passage of flexible material connected to the lower portion of said reservoir and extending laterally therefrom and then diagonally upwardly above said reservoir, means for elevating said reservoir independently of said support, the inclined portion of said passage being fixed to said support whereby when said reservoir is elevated said passage is flexed, and means for leveling said support.

7. In a pressure gauge, a block having a bore leading to a chamber therein, a stopper for closing the upper end of said chamber, an axial opening extending through said stopper and adapted to receive a connector member, said chamber comprising a trap including a valve member, a float for elevating said valve member for closing said opening when the fluid in said chamber rises above a predetermined amount, and a plurality of spaced apart pins extending downwardly from said float for supporting said float above the bottom of said chamber when there is not sufficient liquid in said chamber to support said float.

8. In a pressure gauge, a chamber having an opening to the atmosphere, a support, a reservoir on said support for containing an indicating liquid, a tube flexibly interconnecting said chamber and reservoir, means for raising and lowering said reservoir on said support, said chamber being above the bottom of said reservoir, said tube having a transparent portion, a scale associated with said transparent portion for indicating the liquid level therein, a closure for said opening within said chamber, and a float for elevating said closure for closing said opening when the indicating fluid rises above a predetermined height within said chamber.

9. An indicator unit for a pressure gauge comprising a reservoir, a chamber, a liquid-containing tube of transparent material arranged in the form of an angle with one arm extending upwardly and laterally to said chamber and the other arm connected with said reservoir, said other arm being flexible to permit relative vertical movement between said chamber and said reservoir, and adjustment means for causing relative vertical movement between said chamber and said reservoir to vary the liquid level in said first-mentioned arm of the tube.

10. An indicator unit for a pressure gauge comprising a reservoir, a chamber, a liquid-containing passage means interconnecting said reservoir and said chamber, said passage means being in the form of an angle with a fixed upwardly and laterally extending transparent arm connected to said chamber and with a flexible arm connected to said reservoir, means for raising and lowering said reservoir with consequent flexure of said passage means, and means within said chamber for preventing loss of liquid therefrom.

11. In a pressure gauge, a reservoir, a fluid-containing indicator tube having one end connected to said reservoir, a chamber connected to the other end of said tube for receiving overflow liquid therefrom, said chamber having an opening of reduced diameter in its upper wall, a closure in said chamber for said opening comprising a flexible resilient concave disc, and a float member for elevating said disc when the liquid rises within said chamber to a predetermined level, said disc and float member being structurally separate for independent movement and separate replacement when necessary.

12. In a pressure gauge, an upwardly extending passage containing a column of non-metallic liquid movable therein in response to pressure changes, a normally open vent port at the upper end of said passage, a float body in said passage movable towards said vent port in response to approach of the liquid column to the port, means including a perforated resilient member for establishing a seal to cut off said vent port in response to rise of said float body, said means including also a weighted member for sealing off the perforation in the resilient member and being adapted by its weight to open said seal when said float body moves downward away from the vent port.

FRANK W. DWYER.